(12) United States Patent
Lorieau

(10) Patent No.: US 6,198,926 B1
(45) Date of Patent: Mar. 6, 2001

(54) METHOD FOR ESTABLISHING STANDBY PERIODS IN A BASE STATION AND A HANDSET

(75) Inventor: Christophe Lorieau, Guecelard (FR)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/102,473

(22) Filed: Jun. 22, 1998

(30) Foreign Application Priority Data

Jun. 26, 1997 (FR) .................................................. 97 08034

(51) Int. Cl.⁷ .............................. H04Q 3/02; H04Q 9/14; H04Q 7/20; H04B 1/18
(52) U.S. Cl. .................... 455/434; 455/38.3; 455/425; 455/166.1; 455/166.2; 455/434
(58) Field of Search ........................ 455/161.1–161.3, 455/434, 458, 452, 461, 464, 166.1–166.2

(56) References Cited

U.S. PATENT DOCUMENTS

| 5,276,686 | * | 1/1994 | Ito ....................................... 370/95.1 |
| 5,627,882 | * | 5/1997 | Chien et al. ........................... 379/61 |

FOREIGN PATENT DOCUMENTS

| 0490441A2 | 6/1992 | (EP) ............................... H04Q/7/04 |
| 0526207A2 | 2/1993 | (EP) ............................... H04M/1/72 |

\* cited by examiner

Primary Examiner—Thanh Cong Le
Assistant Examiner—Meless Zewdu
(74) Attorney, Agent, or Firm—Dicran Halajian

(57) ABSTRACT

An invention is disclosed having a base station and a plurality of handsets connected to this base station by various radio channels. For saving on accumulators which supply power to these handsets, these handsets are put in a standby mode for as long periods as possible: notably the periods of scanning for idle channels become very much interspaced with time.

11 Claims, 3 Drawing Sheets

METHOD FOR ESTABLISHING STANDBY PERIODS IN A BASE STATION AND A HANDSET

FIELD OF THE INVENTION

The invention relates to a telephony device comprising:
a base station formed by, inter alia:
  a radio part for transmitting and receiving information signals over a plurality of channels,
  a processing assembly having, inter alia, a read-only memory containing an execution program, and a random-access memory,
at least one handset formed by active and passive elements in the standby period, these elements forming, inter alia:
  a radio part for exchanging information signals with said base station over said plurality of channels,
  a processing assembly having, inter alia, a read-only memory containing an execution program and a random-access memory,
  control means for putting said passive elements in the standby mode during standby periods,
  channel scanning means for scanning outside said standby periods said plurality of channels which are activated via a time delay to define idle channels.

The invention relates to a handset and a base station suitable for such a telephony device.

The invention also relates to a method of establishing standby periods in a handset which forms part of such a telephony device.

BACKGROUND OF THE INVENTION

The invention finds interesting applications in telephony devices satisfying the DECT standard. The invention also shows interest in the standards which impose a permanent search for idle channels, so that an idle channel is to be found quickly without this being noticed too much by the user. However, this monitoring of channels implies the use of electronic circuits which consume electric energy and therefore this channel monitoring reduces the autonomy of the handsets which are usually supplied with power by an accumulator. Furthermore, the DECT standards impose that a requested channel search be made in the 30s prior to a request for a channel link.

SUMMARY OF THE INVENTION

The present invention proposes a device of the type described in the opening paragraph which ensures a better management of the analysis of the idle channels and thus provides a better autonomy for the handsets.

Therefore, such a device is characterized in that a time delay controller is provided for varying the time delay as a function of the availability of said channels.

The idea of the invention consists of spacing the channel scanning the moment the traffic is calm or stable.

Another characteristic feature of the invention according to which reduced-scanning means are provided for carrying out a scanning of a reduced number of channels makes it possible to avoid too long a period for the user when a connection is requested. This reduced scanning profits from scannings effected previously.

These and other aspects of the invention will be apparent from and elucidated with reference to the embodiments described hereinafter.

DETAILED DESCRIPTION OF THE INVENTION

Figure 1:
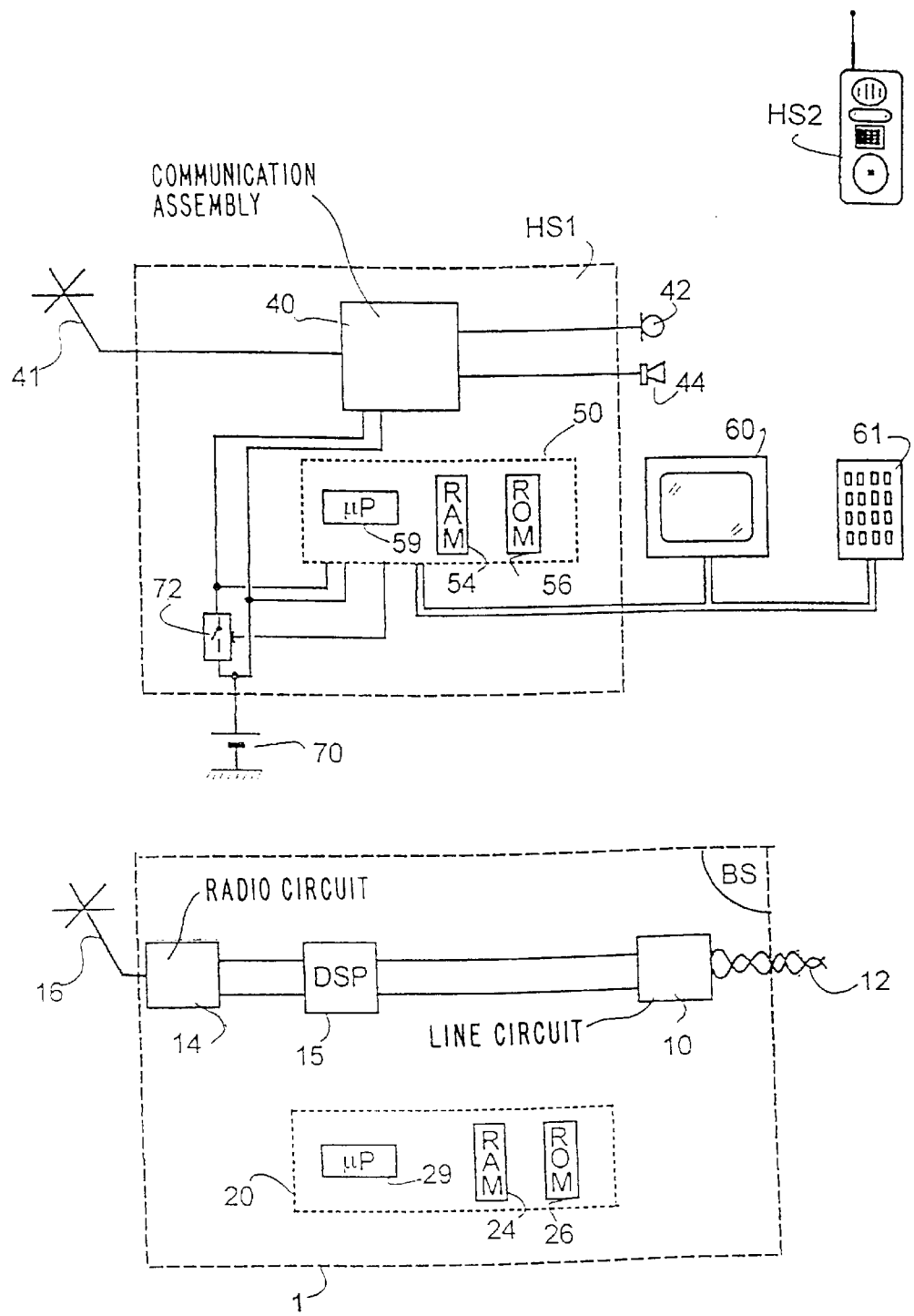
FIG. 1 shows a device according to the invention.

In FIG. 1, the telephony device which is represented is a device satisfying the DECT standards. Reference 1 shows the base station BS to which may be connected by a radio link formed by various channels (CH1, . . . , CH120), a plurality of handsets HS1, HS2, . . . This base station 1 comprises, inter alia, a line circuit 10 which makes it possible for the base station to be connected to the switched network by a telephone line 12 and a radio circuit 14 which authorizes the dialogue with the various handsets HS1, HS2, . . . , by transmitting and receiving waves by an antenna 16. For processing all the information signals of analog type which flow inside the basic circuit, a signal processing element 15 is provided formed around a signal processor DSP which processes notably speech signals.

All the elements of this base station 1 are managed by a microprocessor assembly 20. This element 20 is notably formed in customary manner by a random-access memory 24, a read-only memory 26 containing the operating instructions of the device and a management processor 29.

The handset HS1, the only one shown in detail (the handset HS2 may have an identical structure), comprises a communication assembly 40 which includes an antenna 41 which makes it possible for the handset to communicate with the base station BS and from there with the other handsets HS2, . . . This assembly 40 processes the information signals coming from the microphone 42 and also produces the signals for a loudspeaker 44. Also provided are a management element or a management assembly 50 formed, just like the management element 20, by a random-access memory 54, a read-only memory 56 containing the operating instructions of the device and by a management processor 59. The handset HS1 also includes a display 60 on which various information signals are shown and a keyboard 61. These handsets are mobiles and are therefore supplied with power by an accumulator 70. The handset HS1 is formed by elements which may be put in the standby mode. In this mode, minimum energy is consumed. For illustrating this mode, FIG. 1 shows a switch 72 which is branched to a pole of the accumulator 70. By putting the switch in the open position, various elements included in the various parts of the handset HS1 will receive very little power or no power at all and are thus considered passive in the standby period.

Figure 2:
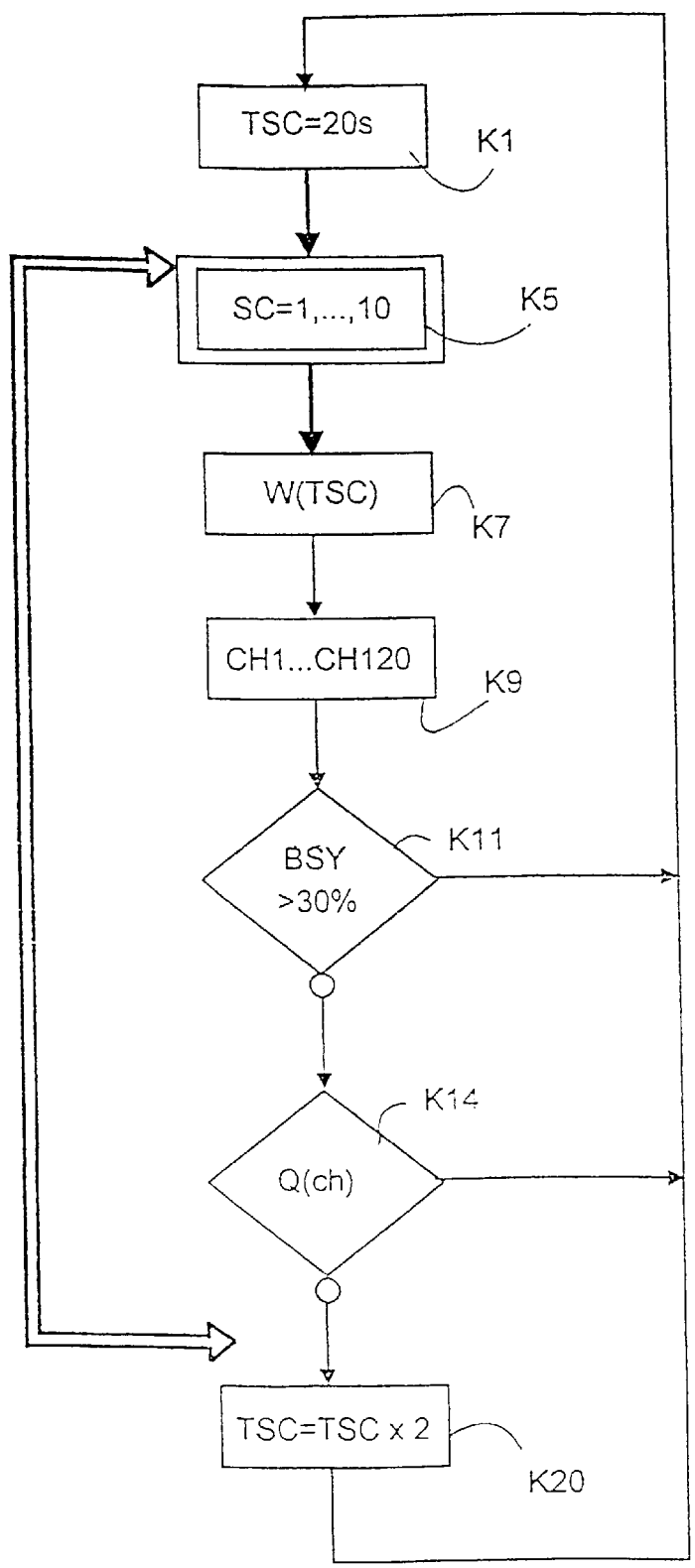
FIG. 2 shows a flow chart explaining the operation of the device for modifying the scanning time delay.

The flow chart represented in FIG. 2 illustrates the operation of the device according to the invention.

Figures 3, 4:
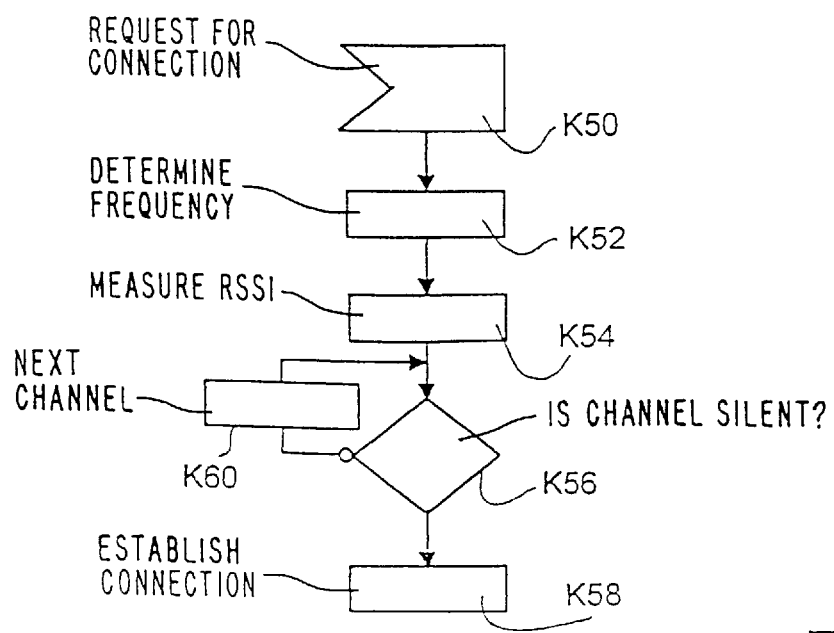
FIG. 3 shows a table formed during the phase of operation illustrated by the flow chart of FIG. 2.
FIG. 4 shows a flow chart explaining a reduced scanning of the channels the moment a request for a link is made.

Box K1 represents an initialization phase of the standby period TSC which is fixed at 20s. In prior art devices this corresponded with the duration imposed in practice by the DECT standards. According to the invention, this duration will be incremented when conditions are good, so that this standby period will become longer thus providing a saving on energy to be produced by the accumulator 70. Box K5 indicates that a succession of ten (for example) RSSI measurements defined by said DECT standard will be brought into effect. This measurement consists of a measurement of the power of the various channels and from there there may be estimated which of these channels are idle. A table as shown in FIG. 3 will thus be established classified according to the level of the RSSI. With each channel one will have the value of the RSSI field if this channel is idle the value QT is "Y", if not, this value is "N". Moreover, the value (F1, F2, F3, . . . ) of the frequency FRQ on which the channel is carried is derived from the channel number. The channels 0 to 9 are transmitted with the frequency F0, the channels 10 to 19 with the frequency F1, the channels 20 to 29 with the frequency F2 etc. This analysis will only be started from after a time period equal to TSC (box K7). Box K9 indicates the actual analysis process. At the end of this process the number of busy and idle channels becomes known. The number of busy channels is estimated in box K11. If the number of busy channels BSY is higher than 30% of the total number of channels, the device is considered to be subjected to heavy traffic load and it is not necessary to prolong the standby period TSC and one thus returns to box K1. If not, box K14 is proceeded to and there is examined whether the idle channels are the same. If there has been a change, the same conclusion as above is made and box K1 is returned to. If (for example) the tests of the boxes K11 and K14 are satisfactory ten times long, the duration TSC is increased substantially: for example, it is doubled as indicated in box K20.

According to one aspect of the invention, the moment the user manipulates the keyboard for satisfying the requirement cited above, a channel scanning is to be carried out. The invention preferably proposes to carry out a reduced scanning of these channels by utilizing the table updated during the most recent scanning. FIG. 4 shows how this reduced scanning may be effected. The flow chart of this FIG. 4 starts with box K50 which indicates a request for a connection. This may thus be made when the user depresses an arbitrary key of his handset as has already been observed. Box K52 indicates that the frequency is determined for which the number of silent channels is largest. Thus the RSSI is measured only on the channels carried with this frequency (box K54). Still with this same frequency, the first silent channel is determined as is indicated in box K56. If the channel is silent, box K58 is proceeded to which is the phase of establishing the connection by using one of said channels. If the channel is not silent, box K60 is proceeded to which induces the analysis of the next channel.

What is claimed is:

1. A method of communicating from a handset to a base station including:

reducing power consumption of said handset in a standby mode during standby periods;

scanning a plurality of channels by said handset outside said standby periods to determine idle channels;

increasing said standby periods when a number of busy channels relative to total available channels is below a predetermined number and when said idle channels are substantially unchanged; and establishing communication with said base station using one of said idle channels.

2. The method of claim 1, wherein said plurality of channels is associated with a frequency having a largest number of said idle channels.

3. The method of claim 1, wherein said one of said idle channels is a first one of said idle channels associated with a frequency having a largest number of said idle channels.

4. A telephony device including a handset and a base station which communicates with said handset, said handset including:

control means for reducing power consumption in a standby mode during standby periods;

channel scanning means for scanning a plurality of channels outside said standby periods; and a time delay controller for increasing said standby periods when a number of busy channels relative to total available channels is below a predetermined number and when idle channels are substantially unchanged.

5. The telephony device of claim 4, wherein said plurality of channels is associated with a frequency having a largest number of said idle channels.

6. The telephony device of claim 4, wherein said communication is established using a frequency having a largest number of said idle channels and using a first one of said idle channels associated with said frequency.

7. The telephony device of claim 4, wherein said telephony device satisfied the DECT standard.

8. A handset which communicates with a base station, said handset including:

control means for reducing power consumption in a standby mode during standby periods;

channel scanning means for scanning a plurality of channels outside said standby periods; and a time delay controller for increasing said standby periods when a number of busy channels relative to total available channels is below a predetermined number and when idle channels are substantially unchanged.

9. The handset of claim 8, wherein said plurality of channels is associated with a frequency having a largest number of said idle channels.

10. The handset of claim 8, wherein said communication is established using a frequency having a largest number of said idle channels and using a first one of said idle channels associated with said frequency.

11. The handset of claim 8, wherein said telephony device satisfied the DECT standard.

* * * * *